US010142265B2

(12) United States Patent
Senjo et al.

(10) Patent No.: US 10,142,265 B2
(45) Date of Patent: Nov. 27, 2018

(54) SERVER, METHOD, AND COMPUTER-READABLE STORAGE MEDIUM STORING A PROGRAM FOR PROVIDING VIDEO CHAT

(71) Applicant: DeNA Co., Ltd., Tokyo (JP)

(72) Inventors: Yoshiki Senjo, Tokyo (JP); Chiaki Kasai, Tokyo (JP); Shunta Iketaki, Tokyo (JP); Koji Murata, Tokyo (JP); Yuji Maeda, Tokyo (JP); Hiroki Akagawa, Tokyo (JP); Sho Miura, Tokyo (JP)

( * ) Notice: Subject to any disclaimer, the term of this patent is extended or adjusted under 35 U.S.C. 154(b) by 114 days.

(21) Appl. No.: 15/045,493

(22) Filed: Feb. 17, 2016

(65) Prior Publication Data

US 2016/0241498 A1 Aug. 18, 2016

(30) Foreign Application Priority Data

Feb. 18, 2015 (JP) ................. 2015-029189

(51) Int. Cl.
*H04L 12/58* (2006.01)
*H04L 12/18* (2006.01)
*H04L 29/06* (2006.01)

(52) U.S. Cl.
CPC ........ *H04L 51/046* (2013.01); *H04L 12/1818* (2013.01); *H04L 51/10* (2013.01); *H04L 65/403* (2013.01)

(58) Field of Classification Search
USPC ................ 709/204, 202, 203, 205
See application file for complete search history.

(56) References Cited

U.S. PATENT DOCUMENTS

| 2014/0082090 A1* | 3/2014 | Wodzinski | ........... G06Q 10/109 |
| | | | 709/205 |
| 2014/0278683 A1* | 9/2014 | Kennell | ............. G06Q 10/1053 |
| | | | 705/7.19 |

(Continued)

FOREIGN PATENT DOCUMENTS

| JP | H11-347003 A | 12/1999 |
| JP | 2003-022326 A | 1/2003 |
| JP | 2012-120098 A | 6/2012 |

OTHER PUBLICATIONS

Non-Final Office Action as issued in Japanese Patent Application No. 2015-029189, dated May 19, 2015.

*Primary Examiner* — Lan Dai T Truong
(74) *Attorney, Agent, or Firm* — Pillsbury Winthrop Shaw Pittman LLP

(57) ABSTRACT

A setup that allows special communication between the user and the specific user is provided. The server in an embodiment includes an information storage unit, an event reservation management unit, a virtual space management unit, and a video chat control unit. The virtual space management unit causes a standby screen to be displayed, the standby screen being a screen for standing by for the video chat with the specific user and including user information of a plurality of users standing by for the video chat. The video chat control unit specifies, in accordance with a predetermined rule, one user from the plurality of users standing by for video chat, and causes the communication for video chat to be performed between the terminal of the specified user and the terminal of the specific user.

12 Claims, 13 Drawing Sheets

(56) References Cited

U.S. PATENT DOCUMENTS

2014/0282656 A1* 9/2014 Belyaev ........... H04N 21/25841
  725/14
2015/0278453 A1* 10/2015 Joao .................. G06F 19/322
  705/3

* cited by examiner

Event Information Management Table 41a

| Event ID | Specific User ID | Time Zone | User ID | Order | Video Chat Duration (sec.) |
|---|---|---|---|---|---|
| I0001 | SU0001 | 12:00 – 12:20 | U0012 | 1 | 30 |
| I0001 | SU0001 | 12:00 – 12:20 | U0030 | 2 | 60 |
| I0001 | SU0001 | 12:00 – 12:20 | U0008 | 3 | 30 |
| ... | ... | ... | ... | ... | ... |
| I0001 | SU0001 | 12:20 – 12:40 | U0065 | 1 | 90 |
| I0001 | SU0001 | 12:20 – 12:40 | U0043 | 2 | 30 |
| ... | ... | ... | ... | ... | ... |
| I0001 | SU0002 | 12:00 – 12:20 | U0065 | 1 | 30 |
| I0001 | SU0002 | 12:00 – 12:20 | U0021 | 2 | 30 |
| ... | ... | ... | ... | ... | ... |
| I0002 | I0002 | 12:00 – 12:20 | U0052 | 1 | 60 |
| ... | ... | ... | ... | ... | ... |

Fig. 3

SERVER, METHOD, AND COMPUTER-READABLE STORAGE MEDIUM STORING A PROGRAM FOR PROVIDING VIDEO CHAT

CROSS-REFERENCE TO RELATED APPLICATIONS

This application is based on and claims the benefit of priority from Japanese Patent Application Serial No. 2015-029189 (filed on Feb. 18, 2015), the contents of which are hereby incorporated by reference in their entirety.

TECHNICAL FIELD

The present invention relates to a server, method, and computer-readable storage medium storing a program for providing video chat, and particularly to a server, method, and computer-readable storage medium storing a program for providing, to a user, video chat with a specific user.

BACKGROUND

In systems for providing contents such as video to user terminals via the Internet, etc., there have conventionally been provided virtual communication spaces where avatars of a plurality of users viewing the same contents are displayed and comments posted by the users are displayed (see, e.g., Japanese Patent Application Publication No. 2012-120098). Such communication spaces are used by some famous people such as entertainment idols to distribute (broadcast) real-time video. Users can communicate with each other by posting comments while viewing the real-time video of a preferred famous person. Further, the comments posted by the users can be viewed by the famous person distributing the real-time video. The users can enjoy communication with the famous person by posting comments.

The above system allows a user to enjoy communication with a famous person by posting comments; however, when a plurality of other users post comments at the same timing, the user's comments may be buried among many comments, and the user cannot enjoy communication with the famous person enough. Further, since the comments posted by the user can be viewed not only by the famous person but also by other users, the user hoping to have special communication with the famous person cannot be satisfied. Accordingly, there is a demand for a setup that facilitates special communication between a user and a specific user such as a famous person.

SUMMARY

One object of embodiments of the present disclosure is to provide a setup that allows special communication between a user and a specific user. Other objects of the embodiments of the present disclosure will be apparent with reference to the entire description in this specification.

A server according to an embodiment of the present disclosure is a server for providing, to a user, video chat with a specific user, comprising: one or more computer processors, wherein the one or more computer processors execute a readable instruction to perform: causing, in response to a request from the user, a standby screen to be displayed on a terminal of the user, the standby screen being a screen for standing by for the video chat with the specific user and including user information of a plurality of users standing by for the video chat with the specific user; and specifying, in accordance with a predetermined rule, one user from the plurality of users standing by, and causing communication for the video chat to be performed between a terminal of the specified user and a terminal of the specific user. The "video chat" is herein also referred to as "television telephone" or "video telephone" which is used to have conversation through speech and image.

A computer-readable storage medium according to an embodiment of the present disclosure is a computer-readable storage medium storing a program for providing, to a user, video chat with a specific user, the program being configured to cause, upon execution on one or more computers, the one or more computers to perform: causing, in response to a request from the user, a standby screen to be displayed on a terminal of the user, the standby screen being a screen for standing by for the video chat with the specific user and including user information of a plurality of users standing by for the video chat with the specific user; and specifying, in accordance with a predetermined rule, one user from the plurality of users standing by, and causing communication for the video chat to be performed between a terminal of the specified user and a terminal of the specific user.

A method according to an embodiment of the present disclosure is a method using one or more computers for providing, to a user, video chat with a specific user, the method comprising: causing, in response to a request from the user, a standby screen to be displayed on a terminal of the user, the standby screen being a screen for standing by for the video chat with the specific user and including user information of a plurality of users standing by for the video chat with the specific user; and specifying, in accordance with a predetermined rule, one user from the plurality of users standing by, and causing communication for the video chat to be performed between a terminal of the specified user and a terminal of the specific user.

Various embodiments of the present disclosure provide a setup that allows special communication between a user and a specific user.

BRIEF DESCRIPTION OF THE DRAWINGS

FIG. 3 is a diagram showing an example of information managed by the event information management table 41a according to an embodiment.

DESCRIPTION OF EXAMPLE EMBODIMENTS

Figure 1:
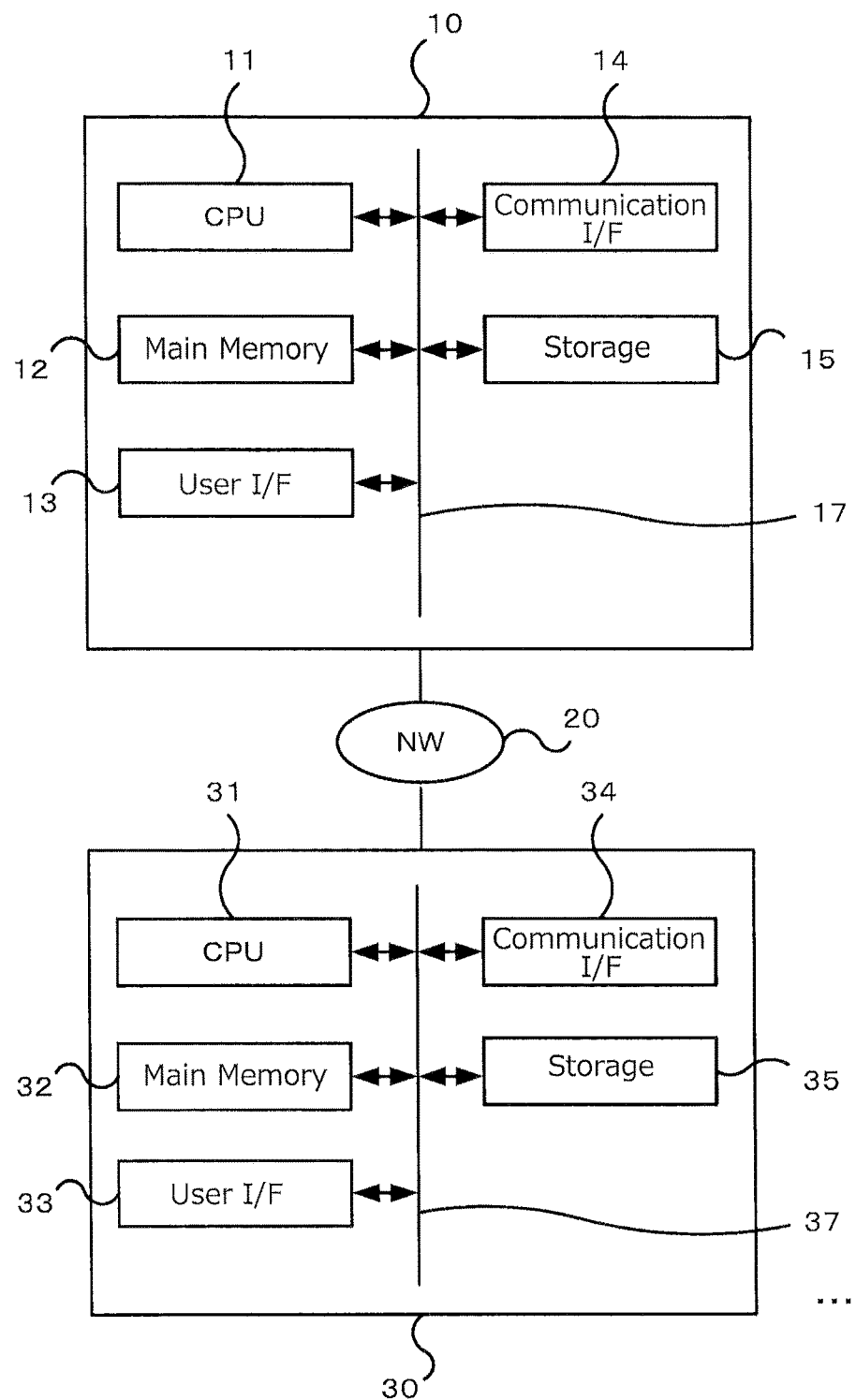
FIG. 1 is a block diagram schematically illustrating a system including a server 10 according to an embodiment of the present disclosure.

FIG. 1 is a block diagram schematically illustrating a system including a server 10 according to an embodiment of the present disclosure. As shown, the server 10 according to an embodiment may be communicatively connected to a plurality of terminals 30 via a communication network 20 such as the Internet; and the server 10 may provide, to the users of the terminals 30, video chat with a specific user such as a famous person. In an embodiment, the video chat with a specific user may be provided as an online event in content distribution service for distributing various contents including real-time video to the terminals 30 via a virtual communication space (hereinafter also referred to simply as "virtual space").

As illustrated, the server 10 according to the embodiment is configured as a common computer device and may include a central processing unit (CPU) (computer processor) 11, a main memory 12, a user interface (I/F) 13, a communication I/F 14, and a storage 15, and these components may be electrically connected to one another via a bus 17. The CPU 11 may load an operating system and various other programs into the main memory 12 from the storage 15, and may execute commands included in the loaded programs. The main memory 12 may be used to store a program to be executed by the CPU 11, and may be formed of, for example, a dynamic random access memory (DRAM) or the like. The server 10 according to an embodiment may be configured from computer devices that have the above-described hardware configurations.

The user I/F 13 may include, for example, an information input device such as a keyboard and a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The storage 15 may be formed of, for example, a magnetic disk drive and store various programs such as a control program for controlling the provision of the content distribution service described above. The storage 15 may also store various data used in the content distribution service. The various data that may be stored in the storage 15 may also be stored on a database server communicatively connected to the server 10 and physically separate from the server 10.

In an embodiment, the server 10 may function as a web server for managing a web site including a plurality of hierarchical web pages and may provide the user of the terminal 30 with the content distribution service through the web site. The storage 15 may also store the HTML data corresponding to the web page. Additionally, the HTML data may include programs written in script languages such as JavaScript™.

In an embodiment, the server 10 may provide the content distribution service to the terminal 30 through applications executed on execution environments other than a web browser on the terminal 30. The storage 15 may also store such applications. The game application programs may be created in, for example, programming languages such as Objective-C™ and Java™. The application stored on the storage 15 may be delivered to the terminal 30 in response to a delivery request. The terminal 30 may download such applications from a server (a server providing application markets) other than the server 10.

Thus, the server 10 may manage the web site for providing the content distribution service and deliver web pages (HTML data) constituting the web site in response to a request from the terminal 30, thereby providing the content distribution service to a user of the terminal 30. Also, the server 10 can provide the content distribution service based on communication with an application performed on the terminal 30 in place of, or in addition to, such web-page (web browser)-based service. The server 10 can transmit and receive various data (including data necessary to display a screen) to/from the terminal 30 in order to provide the content distribution service in any manner. The server 10 can store various types of data that are required to provide the service. The server 10 may store such data for each piece of identification information (for example, user ID) that identifies each user and thereby can manage the status of the service provided to each user. Briefly, the server 10 may also include a function to authenticate a user at start of the service and perform charging process in accordance with provision of the service.

The terminal 30 according to an embodiment may be any information processing device that may display on a web browser a web page of a web site provided by the server 10 and include an executing environment for executing applications. As an example of such information processing device may include personal computers, smartphones, tablet terminals, wearable devices, and game-dedicated terminals.

As illustrated in FIG. 1, the terminal 30 may be configured as a typical computer device that includes a central processing unit (CPU) (computer processor) 31, a main memory 32, a user interface (I/F) 33, a communication I/F 34, and storage 35, and these components may be electrically interconnected via a bus 37.

The CPU 31 may load an operating system and various other programs into the main memory 32 from the storage 35, and may execute commands included in the loaded programs. The main memory 32 may be used to store a program to be executed by the CPU 31, and may be formed of, for example, a dynamic random access memory (DRAM) or the like.

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The storage 35 may comprise, for example, a magnetic disk drive or a flash memory and store various programs such as an operating system. The storage 35 may also store various applications received from the serve 10 and the like.

The terminal 30 may include, for example, a web browser for interpreting an HTML file (HTML data) and rendering a screen; this web browser may enable the terminal 30 to interpret the HTML data fetched from the server 10 and render web pages corresponding to the received HTML data.

A plug-in software item that can execute files of various formats associated with the HTML data may be embedded in the web browser of the terminal 30.

When a user of the terminal 30 uses various services provided by the server 10, for example, animation or an operation icon designated by HTML data or applications may be displayed on a screen of the terminal 30. A user can input various instructions via a touch panel or the like of the terminal 30. The instruction entered by the user may be transmitted to the server 10 through the web browser or a function of an execution environment such as NgCore™ on the terminal 30.

Next, operations of the above-described server 10 according to an embodiment will be now described. As described above, the server 10 may provide the content distribution service for distributing contents via a virtual communication space. The following description will be focused on the function to provide the video chat with a specific user as an online event in the content distribution service.

Figure 2:
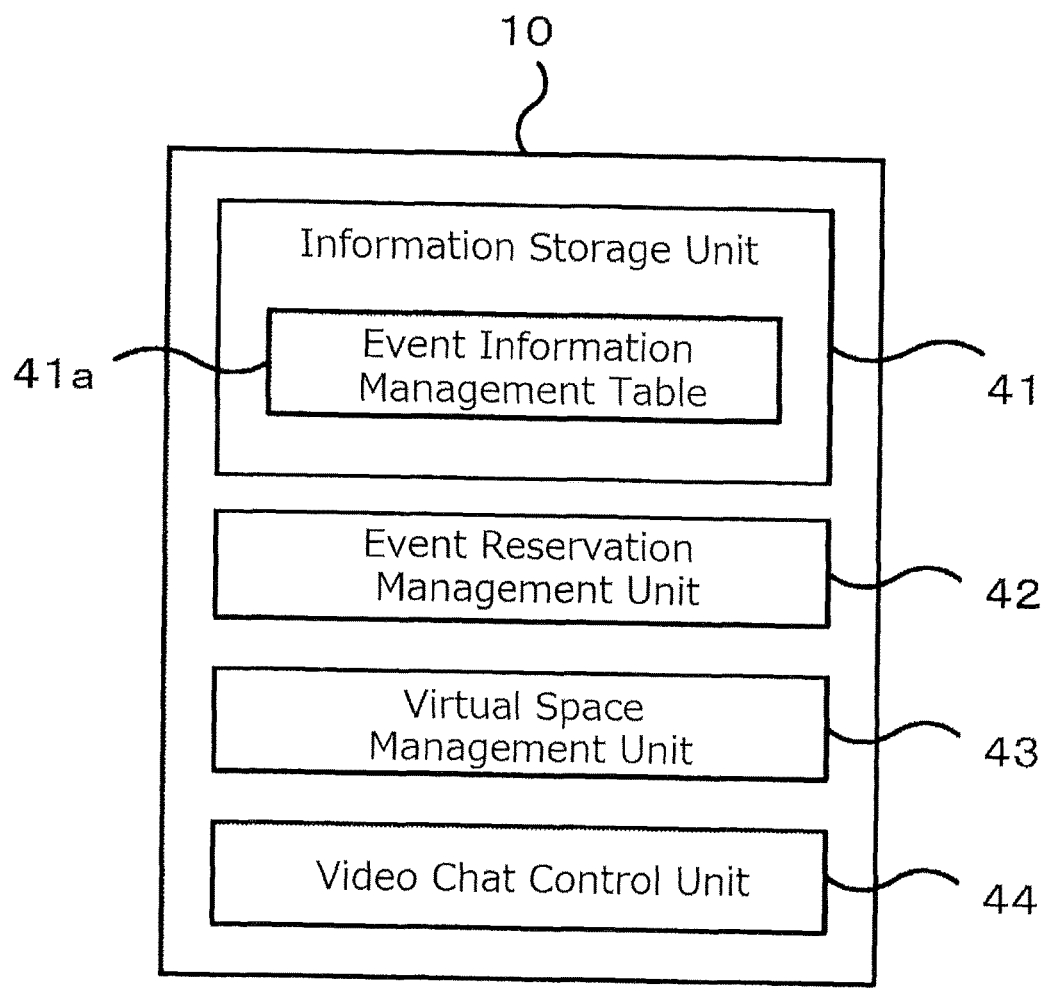
FIG. 2 is a block diagram illustrating the functionality of the server 10 according to an embodiment.

FIG. 2 is a block diagram illustrating the functionality of the server 10 according to an embodiment. As shown, the server 10 in an embodiment may include an information storage unit 41 for storing information, an event reservation management unit 42 for managing reservation of online events by users, a virtual space management unit 43 for managing virtual spaces constituting the virtual sites of the online events, and a video chat control unit 44 for controlling video chat performed between the users participating in the online events and specific users. These functionalities may be implemented by cooperation between hardware such as the CPU 11 and the main memory 12 and various programs and tables stored on the storage 15. An example of such cooperation may be execution of instructions included in a loaded program by the CPU 11. Further, a part or all of the functions of the server 10 illustrated in FIG. 2 may be implemented through cooperation between the server 10 and the terminal 30.

The information storage unit 41 according to the embodiment may be implemented with the storage 15 or the like and may include an event information management table 41a for managing information on online events, as shown in FIG. 2. FIG. 3 is a diagram showing an example of information managed by the event information management table 41a according to an embodiment. As shown, the event information management table 41a may include: "event ID" identifying individual online events; "specific user ID" identifying specific users with whom the users perform video chat in the online events, "time zone" indicating the time zone in which to perform video chat with the specific users; and "user ID" identifying users having reserved video chat with the specific users. Additionally, in association with combination of these items, the event information table 41a may also include: "order" indicating the order of the users performing the video chat in the time zone; and "duration (sec.)" indicating the time during which the users can perform video chat in the time zone. In an embodiment, one or more specific users may participate in one online event. For example, in an online event where video chat with one entertainment idol is possible, the one entertainment idol may participate as a specific user. By contrast, in an online event where video chat with an entertainment idol group constituted by a plurality of members is possible, the plurality of members constituting the entertainment idol group may participate as specific users.

The event reservation management unit 42 in an embodiment may cause a reservation screen for reserving video chat with a specific user to be displayed on the terminal 30 of a user, in response to a request from the user of the terminal 30. For example, the event reservation management unit 42 may generate a part or all of the screen data of the reservation screen and send the screen data to the terminal 30. The event reservation management unit 42 in an embodiment may receive a reservation by the user of the terminal 30 via the reservation screen, and update the event information management table 41a such that the user may be specified as a user who is allowed to participate in the video chat. For example, the event reservation management unit 42 may receive various data sent from the terminal 30 in accordance with the user operation on the reservation screen, and update various information in the event information management table 41a based on the various data received.

The virtual space management unit 43 in an embodiment may cause, in response to a request from the user of the terminal 30, a standby screen to be displayed on the terminal 30 of the user. The standby screen may be a screen for standing by for video chat with the specific user and may include user information of a plurality of users standing by for video chat with the specific user. For example, the virtual space management unit 43 may generate, for each specific user, a virtual space for standing by for video chat. Upon receiving from a terminal 30 data that require access (entry) to the virtual space, the virtual space management unit 43 may generate a part or all of the screen data of the standby screen including the virtual space and send the screen data to the terminal 30. In the virtual space, avatars of a plurality of users entering the virtual space and standing by for video chat with the specific user may be displayed as user information.

The video chat control unit 44 in an embodiment may specify, in accordance with a predetermined rule, one user from the plurality of users standing by for video chat with the specific user, and may cause the communication for video chat to be performed between the terminal 30 of the specified user and the terminal 30 of the specific user. For example, the video chat control unit 44 may receive video (image and speech) data of the user specified in accordance with the predetermined rule, the video data being inputted via a microphone and a camera on the terminal 30 of the specified user; and the video chat control unit 44 may send the received video data to the terminal 30 of the specific user. Simultaneously, the video chat control unit 44 may receive video data of the specific user inputted via a microphone and a camera on the terminal 30 of the specific user, and send the received video data to the terminal 30 of the specified user. Further, the video chat control unit 44 in an embodiment may start sending, to a certain terminal 30, the video data sent from the terminal 30 of the user specified in accordance with the predetermined rule; and in response to an instruction from the user of the certain terminal 30, the video chat control unit 44 may start sending the video data sent from the terminal 30 of the specific user to the terminal 30 of the specified user. Still further, the video chat control unit 44 in an embodiment may terminate the communication for the video chat when a predetermined amount of time elapsed after the user specified in accordance with the predetermined rule started the video chat with the specific user and/or when the current time reached a predetermined time.

Figure 4:
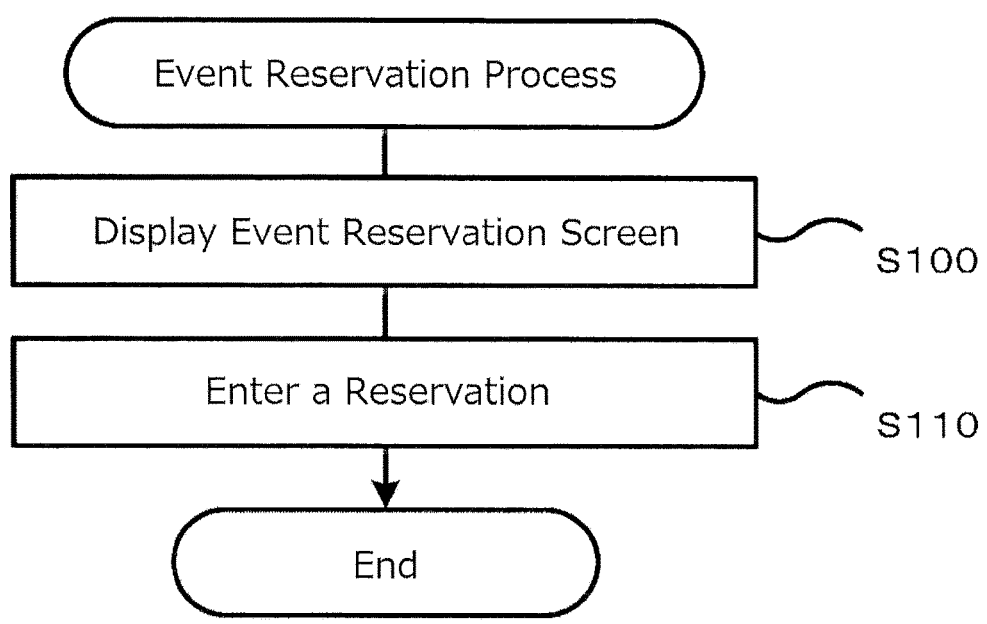
FIG. 4 is a flow diagram showing an example of an event reservation process according to an embodiment.

Next, operations of the server 10 according to an embodiment having such functions will now be described. The following description will be focused first on the operation performed when the user reserves an online event, and then on the operation performed when the online event is performed. FIG. 4 is a flow diagram showing an example of an event reservation process performed by the server 10 in an embodiment. The event reservation process may be performed when the data that require reservation of an online event is received from a terminal 30. As shown, the first step of the event reservation process may be to display on the terminal 30 a reservation screen for reserving an online event (video chat with the specific user). The reservation screen in an embodiment may be constituted by an event selection screen 50A for selecting an online event, a numbered ticket entry screen 50B for entering a numbered ticket required to participate in an online event, and a time zone selection screen 50C for selecting a time zone for reservation of video chat.

Figure 5:
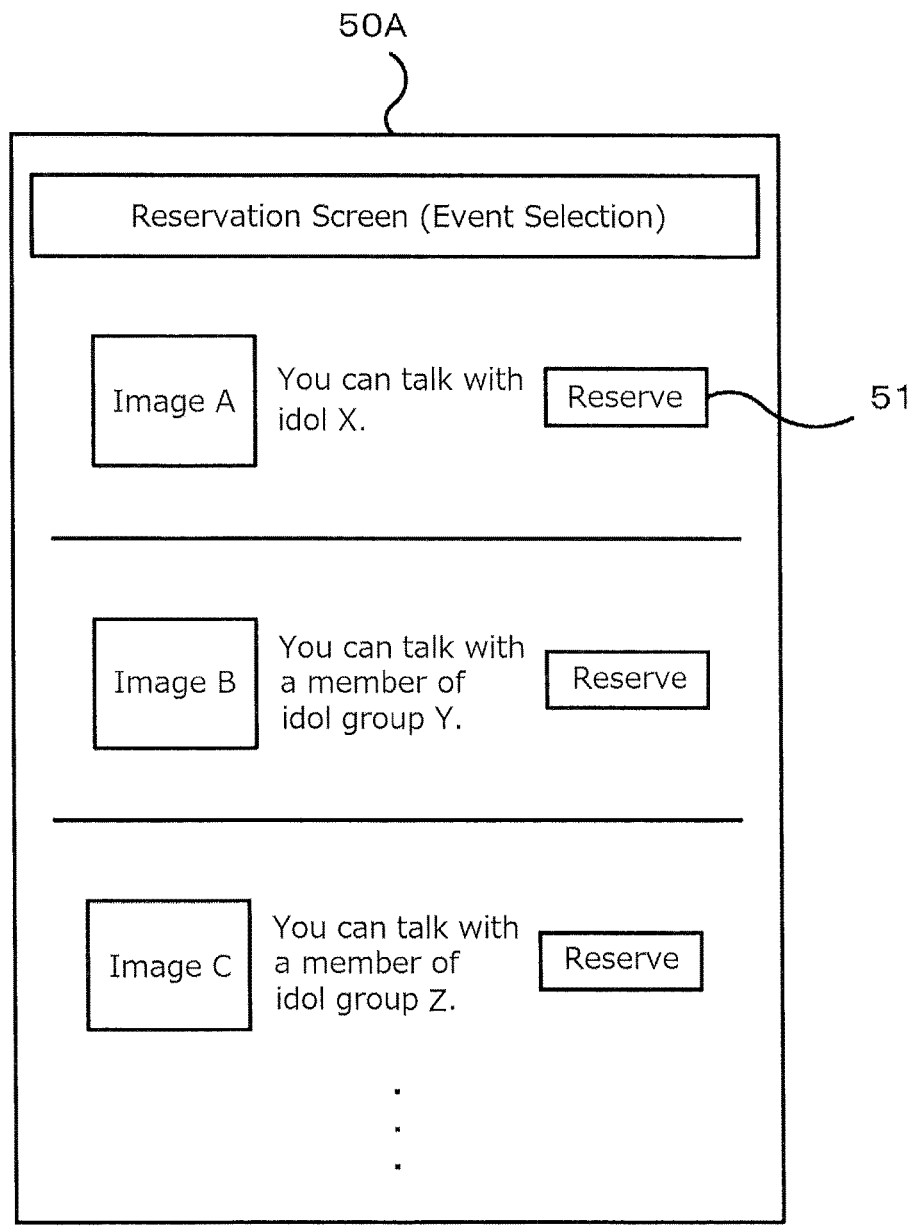
FIG. 5 illustrates an example of event selection screen 50A (reservation screen) according to an embodiment.

FIG. 5 shows an example of event selection screen 50A according to an embodiment. As shown, the event selection screen 50A may display a list of information items related to online events open for reservation. The information items displayed in the list may include images associated with the online events and explanation of the online events, with event selection buttons 51 captioned "Reserve" on the right of the information items. The user may select an event selection button 51 corresponding to a desired online event by a tap operation, etc. thereby to select an online event to be reserved.

Figure 6:
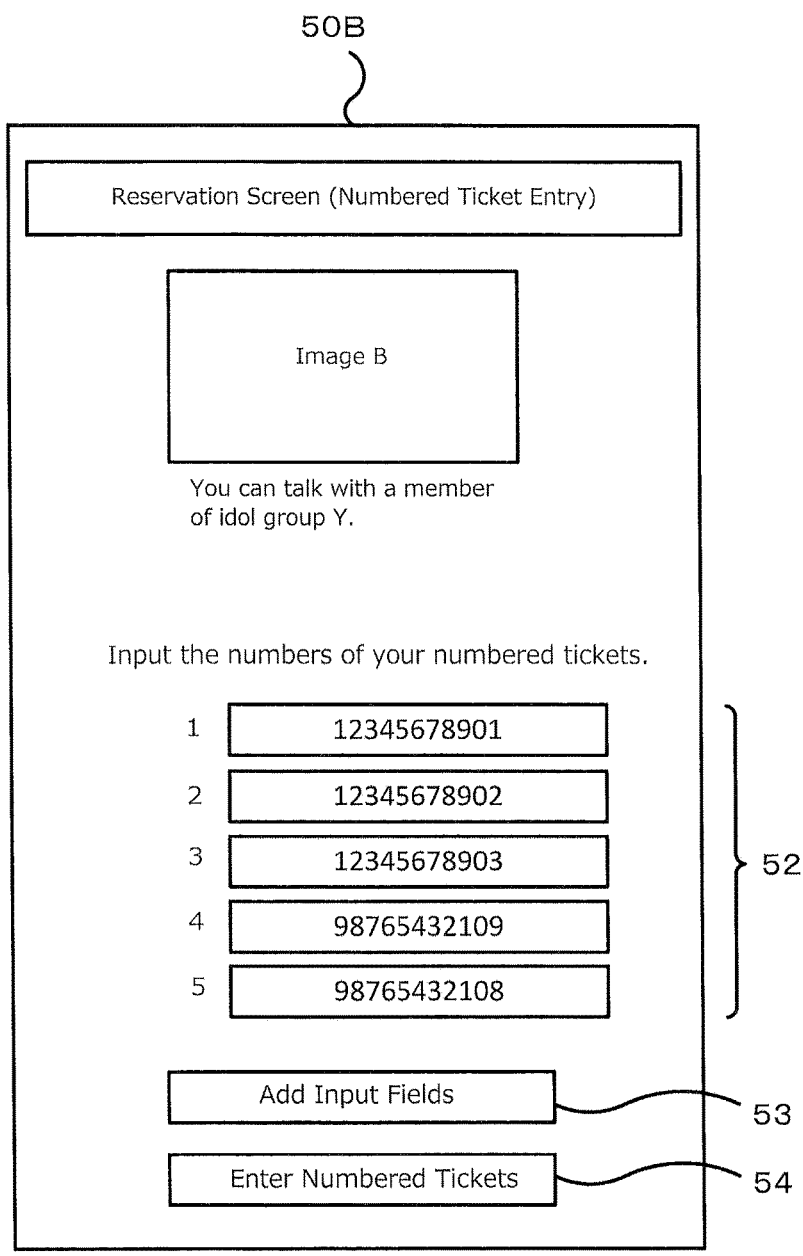
FIG. 6 illustrates an example of numbered ticket entry screen 50B (reservation screen) according to an embodiment.

When the user selects an event selection button 51 on the event selection screen 50A, the numbered ticket entry screen 50B illustrated in FIG. 6 may be displayed on the terminal 30. As shown, the numbered ticket entry screen 50B in an embodiment may be arranged as follows. The upper region of the screen may include information items (an image, explanation, etc.) related to the selected online event; the middle region may include number input area 52 for inputting the numbers of the numbered tickets (reservation information); and the lower region may include an input field adding button 53 captioned "Add Input Fields" and a numbered ticket entry button 54 captioned "Enter Numbered Tickets." In an embodiment, a numbered ticket is necessary for a user to participate in an online event. For example, when a user purchases a musical piece, an album, etc. of an entertainment idol group, the user can obtain a numbered ticket for participating in an online event related to the entertainment idol group. As shown, the number input area 52 is initially configured such that five numbers can be inputted (this area contains five input fields). When the user selects the input field adding button 53, a predetermined number (e.g., five) of input fields may be newly added. The user may input the numbers of his own numbered tickets into the input fields within the number input area 52 and select the numbered ticket entry button 54.

In the case where a number inputted in the number input area 52 is incorrect, an error process may be performed to display an error message when the user selects the numbered ticket entry button 54. For example, the numbers of the numbered tickets may be previously stored on the storage 15 in association with online events. When an inputted number does not correspond to any of the numbers of the numbered tickets associated with the selected online event, the inputted number is determined to be incorrect and an error message may be displayed.

Figure 7:
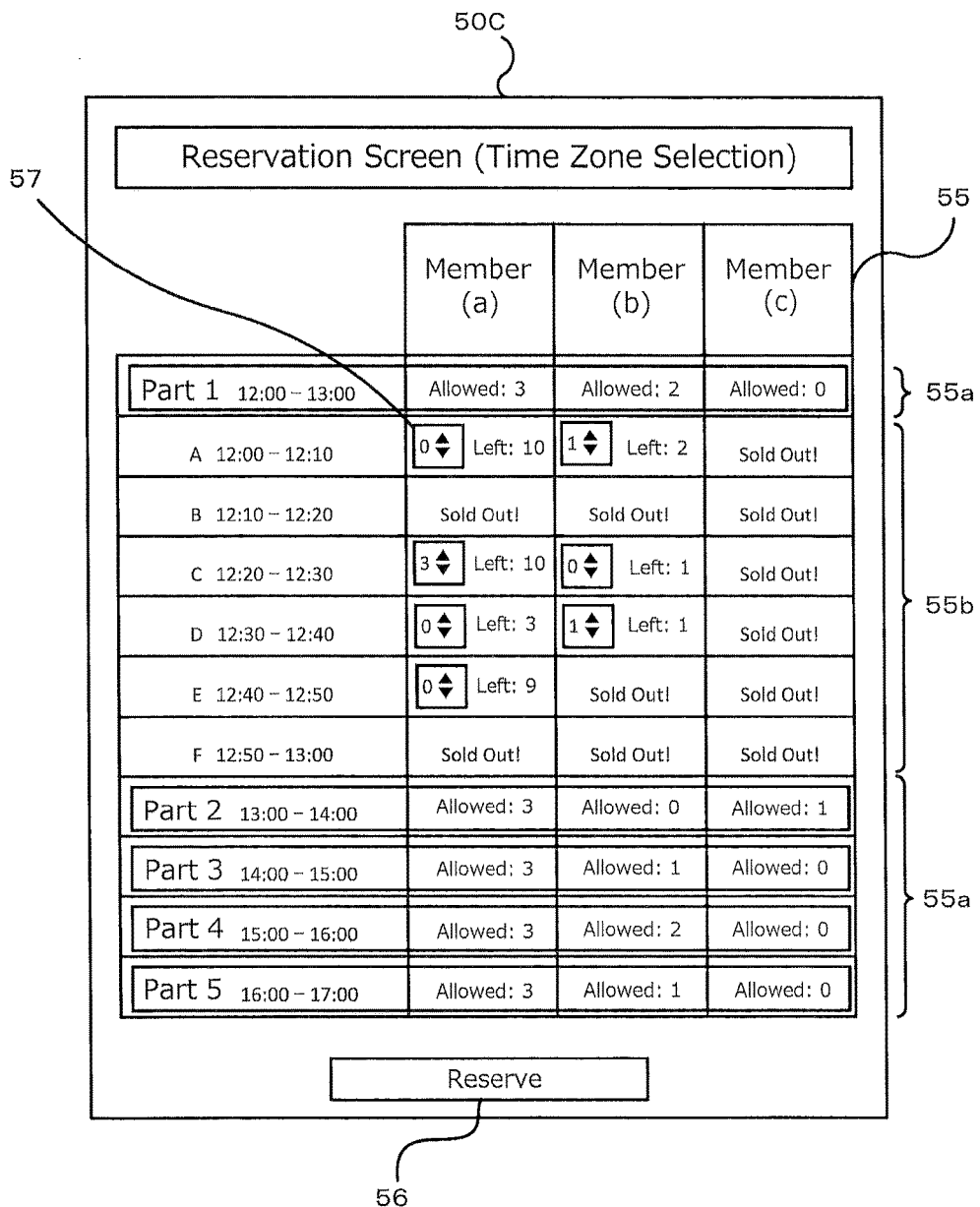
FIG. 7 illustrates an example of time zone selection screen 50C (reservation screen) according to an embodiment.

When the user inputs a number of a numbered ticket on the numbered ticket entry screen 50B and selects the numbered ticket entry button 54, the time zone selection screen 50C illustrated in FIG. 7 may be displayed on the terminal 30. As shown, the time zone selection screen 50C in an embodiment may include a time zone selection area 55 for the user to select a time zone for reservation of video chat with a specific user, and a reservation button 56 arranged below and captioned "Reserve." The time zone selection area 55 may have a tabular form wherein the rows correspond to time zones, while the columns correspond to specific users.

In an embodiment, each numbered ticket may be associated with one specific user, and the specific users displayed in the time zone selection area 55 may be associated with the numbered tickets having the numbers inputted on the numbered ticket entry screen 50B. Such association between the numbers of the numbered tickets and the specific users may be previously stored on the storage 15, etc. FIG. 7 shows an example case where each of a plurality of numbered tickets having inputted numbers is associated with any one of "member (a)," "member (b)," and "member (c)" included in an entertainment idol group. These members are displayed in the time zone selection area 55 as specific users. For example, in the case of an online event in which only one specific user participates, the time zone selection area 55 may include the one specific user only.

In the example shown in FIG. 7, the time zones for reservation of video chat are in the unit of ten minutes (e.g., "A 12:00-12:10"), and six time zones constitute "a part" in the unit of one hour (e.g., "Part 1 12:00-13:00"). In an embodiment, the time zone selection area 55 may initially display part rows 55a displaying part-based information; and when the user selects any of the part rows 55a, the time zone rows 55b displaying the time zone-based information of the six time zones constituting the associated part may be displayed below.

The time zone rows 55b may include, for each specific user, the remained number of numbered tickets that can be entered in the corresponding time zone (e.g., "Left: 10") and a ticket count input area 57 for inputting the number of numbered tickets to be entered by the user. In an embodiment, the user can perform video chat for a predetermined time period with one numbered ticket. In the example shown in FIG. 7, the video chat can be performed for 30 seconds with one numbered ticket. Accordingly, up to 20 numbered tickets can be entered in one time zone set in the unit of ten minutes (10 min./30 sec.=20). The remaining number of the numbered tickets that can be entered, which is displayed in the time zone rows 55b, is the remainder obtained by subtracting the number of numbered tickets having been entered from the maximum number of numbered tickets that can be entered for the tine zone. As illustrated in FIG. 7, cells for which the maximum number of numbered tickets that can be entered have already been entered show the message "Sold Out!" and do not include the ticket count input area 57.

The part rows 55a may include, for each specific user, the number of numbered tickets that can be entered for the corresponding part (e.g., "Allowed: 3") among the numbered tickets having the numbers inputted on the numbered tickets entry screen 50B by the user. In the example shown in FIG. 7, the user has inputted the numbers of three numbered tickets associated with the specific user "member (a)." Since the total of the remaining number of numbered tickets that can be entered in the six time zones constituting the part "Part 1 12:00-13:00" is not less than three (32), the corresponding cell displays "Allowed: 3." In the example shown in FIG. 7, the user has inputted the number of one numbered tickets associated with the specific user "member (c)." However, since the maximum number of numbered tickets that can be entered have already been entered in all of the six time zones constituting the part "Part 1 12:00-13: 00" (the message "Sold Out!" is displayed for all the time zones), the corresponding cell displays "Allowed: 0." To make a reservation for video chat with the specific user "member (c)," the user have to select, from the time zones constituting the part "Part 2 13:00-14:00" displaying "Allowed: 1," a time zone in which the number of numbered tickets entered is less than the maximum number (the remaining number of numbered tickets that can be entered is one or greater).

In an embodiment, a user can reserve video chat with a plurality of specific users in the same online event as long as the reservations are made for different time zones. Further, when a user has a plurality of numbered tickets associated with one specific user, the user can either enter the plurality of numbered tickets in one time zone only or enter one or more numbered tickets in a plurality of time zones in a distributed manner. In an embodiment, when the user enters a plurality of numbered tickets in one time zone, the user can perform video chat with the specific user for a continuous time period in accordance with the number of numbered tickets entered.

When the user inputs the number of the numbered tickets in the time zone selection area 55 of the time zone selection screen 50C and selects the reservation button 56, the server 10 may receive the reservation of video chat by the user and update the event information management table 41a (step S110), and then terminate the event reservation process. More specifically, the server 10 may set the "user ID" of the user and the "duration (sec.)" in association with the combination of the associated "event ID)," "specific user ID," and "time zone." The field "duration (sec.)" may be set to a value of the duration for each numbered ticket (e.g., 30 seconds) multiplied by the number of numbered tickets inputted.

Figure 8:
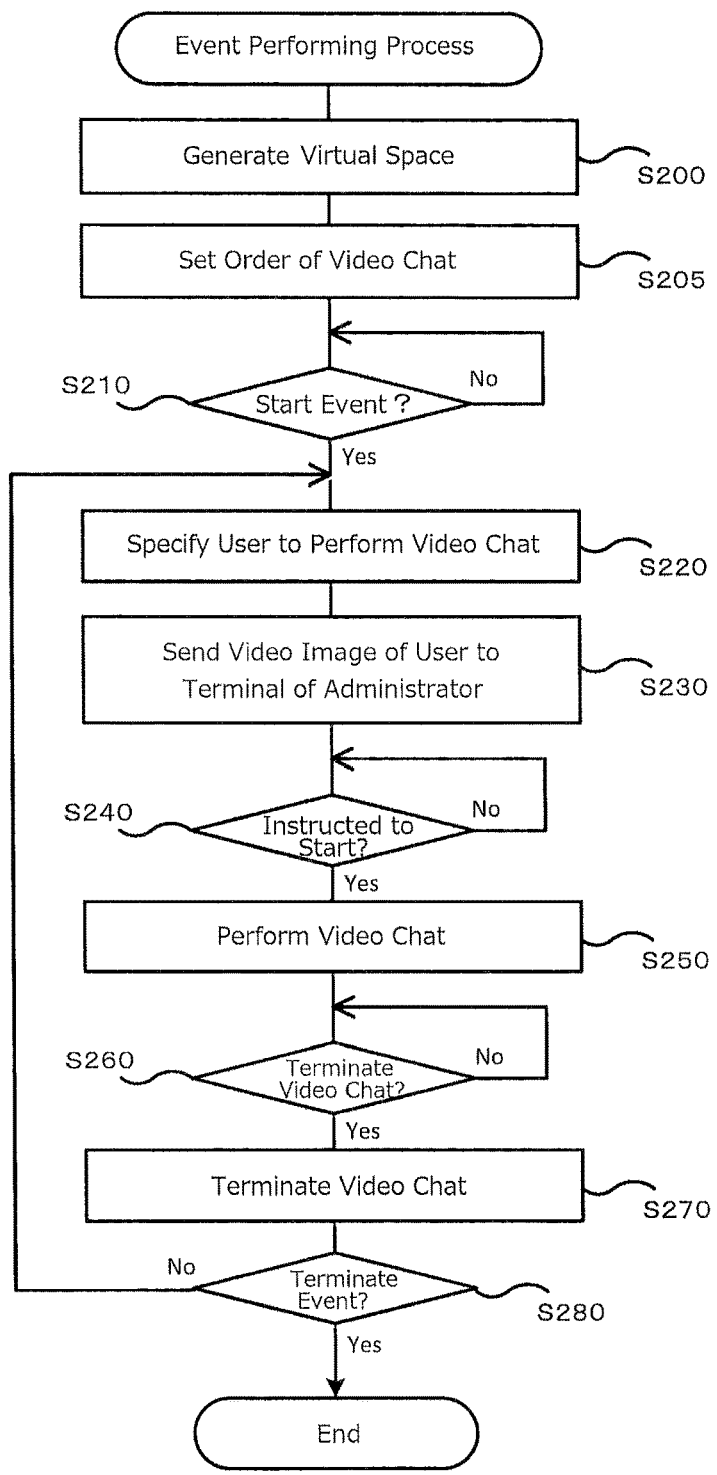
FIG. 8 is a flow diagram showing an example of an event performing process according to an embodiment.

The operation performed when the user makes a reservation for an online event has been described. Next, the operation performed when the online event is performed will be described. FIG. 8 is a flow diagram showing an example of an event performing process performed by the server 10 in an embodiment. The event reservation process may be performed, e.g., a predetermined amount of time (e.g., 30 minutes) ahead of the starting time of the online event.

As shown, the first step of the event performing process may be to generate a virtual space where the online event is to be performed in a virtual manner (step S200), and the second step may be to set the order of the user to perform the video chat in accordance with the order to enter the virtual space. When a plurality of specific users participate in the online event, a virtual space may be generated for each of the specific users.

Figure 9:
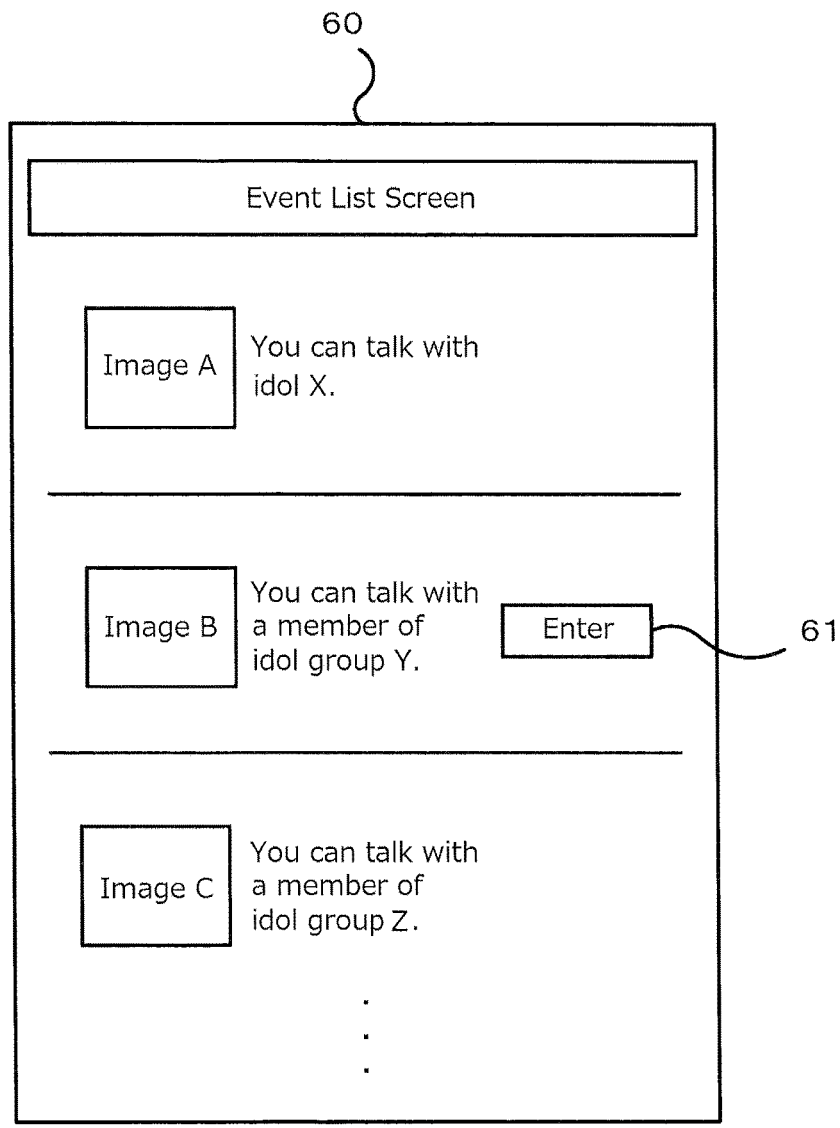
FIG. 9 is a diagram showing an example of event list screen 60 according to an embodiment.

In an embodiment, the user can enter a virtual space where the online event is performed, via the event list screen 60 displaying a list of online events included in the content distribution service provided by the server 10. FIG. 9 shows an example of event list screen 60. As shown, the event list screen 60 in an embodiment may display a list of online events included in the content distribution service. An entrance button 61 captioned with "Enter" may be placed for each online event for which the user has made a reservation by entering the numbered tickets and a virtual space where the online event is to be performed has been generated (that is, for example, the time a predetermined amount of time ahead of the starting time has elapsed). Thus, in an embodiment, only the user who has previously entered the numbered tickets and made a reservation for participating in an online event can enter the virtual space for the online event.

Figure 10:
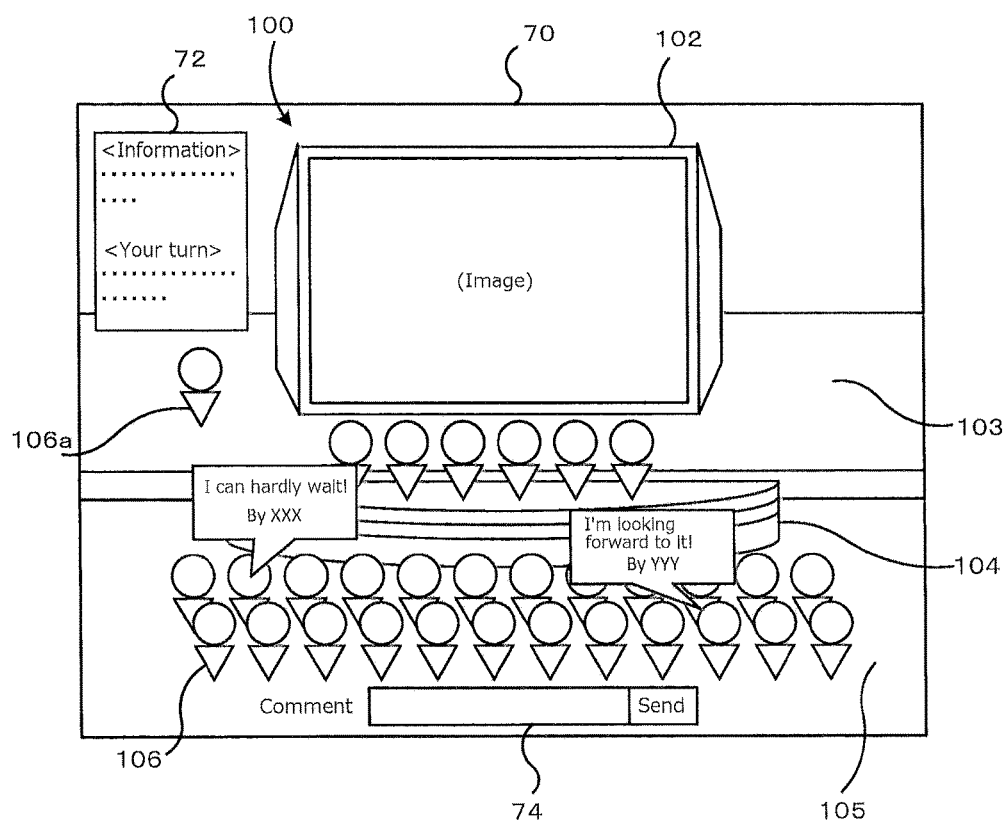
FIG. 10 is a diagram showing an example of standby screen 70 according to an embodiment.

When the user selects the entrance button 61, the standby screen 70 illustrated in FIG. 10 may be displayed on the terminal 30, and the user's turn to perform the video chat may be set. The order of the users to perform the video chat may be set in accordance with the order to enter the virtual space and may be recorded in the "order" field of the event information management table 41a.

As shown, the standby screen 70 in an embodiment may display a virtual space 100 over the entirety of the screen with an information area 72 placed in the upper left corner of the screen and a comment posting area 74 placed in the center of the bottom of the screen. When a plurality of specific users participate in the online event, the virtual space 100 corresponding to the specific user for whom the user has made a reservation of video chat may be displayed. When the user has made a reservation of video chat with a plurality of specific users, the virtual space 100 corresponding to the specific user for whom the reservation of the video chat in the earliest time zone has been made may be displayed. When a plurality of specific users participate in the online event, it may be possible that the user selects a specific user on the event list screen 60 (or a screen reached therefrom), and the user enters a virtual space corresponding to the specific user selected by the user (the standby screen 70 including the corresponding virtual space 100 is displayed).

The virtual space 100 may include a main stage 103, a sub stage 104, and a floor 105; and a display object 102 for displaying images of a specific user may be placed on the main stage 103. The virtual space 100 may also include avatars 106 of the users standing by for video chat with the specific user. In an embodiment, the avatars 106 may be displayed at the positions in accordance with the order to perform the video chat. More specifically, in an embodiment, the avatar 106a of the user first to perform the video chat may be placed at the left end of the main stage 103 (on the left of the display object 102), the avatars of the second to seventh users may be placed on the sub stage 104 in accordance with the order of the users, and the avatars of the other users may be placed on the floor 105. The avatars of the users placed on the floor 105 may also be arranged in accordance with the order of the users. In an embodiment, the display object 102 may display, e.g., a still image of the specific user instead of a video image of the specific user until the video chat is started The information area 72 may display various information such as progress of the online event, including information commonly related to a plurality of users entering the virtual space 100 and information specifically related to the user of the terminal 30 (e.g., information on the user's turn or expected waiting time).

The comment posting area 74 may be configured to allow input of a desired character string by the user. When the user makes an instruction for sending the inputted character string, the inputted character string may be sent to the server 10 and displayed in a balloon from the avatar 106 of the user in the virtual space 100 (FIG. 10 shows, e.g., "I can hardly wait! by XXXX" and "I'm looking forward to it! by YYYY" ("XXXX" and "YYYY" are names or nicknames of the users)). Thus, the standby screen 70 in an embodiment may be configured such that the users entering the virtual space and standing by for the video chat with the specific user can perform text chat with each other.

Thus, the virtual space is generated and the order of the users to perform the video chat is set in accordance with the order to enter the virtual space. When the condition to start the online event (e.g., elapse of a predetermined time) is satisfied (step S210), one user may be specified from a plurality of users standing by as a performing user to perform the video chat (step S220). The performing user may be specified in accordance with the order to perform the video chat. More specifically, the user having the earliest turn among the users yet to perform the video chat may be specified as the performing user.

Figure 11:
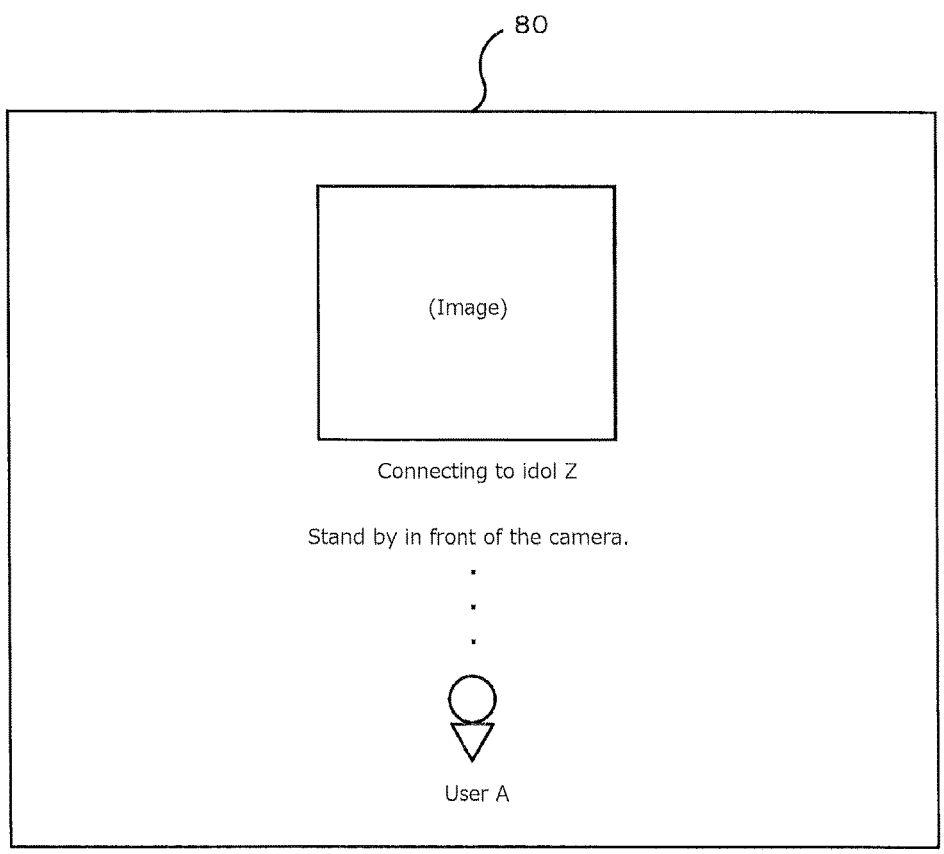
FIG. 11 is a diagram showing an example of performing screen 80 according to an embodiment.

Then, a real-time video image of the specified performing user may be sent to the terminal 30 of an administrator (step S230). More specifically, the server 10 may receive the video data inputted via a camera and a microphone of the terminal 30 of the performing user and send the video data to the terminal 30 of the administrator. FIG. 11 shows an example of performing screen 80 for performing the video chat with the specific user. The performing screen 80 may be displayed on the terminal 30 of the performing user. As illustrated in FIG. 11, the performing screen 80 at step S230 may only display a notification that the connection with the specific user (the entertainment idol Z) is being established and may not display the video image of the specific user.

When the data for making an instruction for starting the video chat is received from the terminal 30 of the administrator (step S240), the video chat may be performed between the performing user and the specific user (step S250). Thus, in an embodiment, only the video image of the performing user may be first displayed on the terminal 30 of the administrator, and in response to the starting instruction from the administrator, the video chat may be started between the performing user and the specific user. Therefore, it can be prevented that the video chat is started between an improperly behaving user and the specific user.

In the above-described embodiment, the video chat may be started between the performing user and the specific user in response to the starting instruction from the administrator; however, it may also be possible that the video image of the performing user is sent to the terminal 30 of the specific user and, in response to the starting instruction from the specific user, the video chat is started between the performing user and the specific user.

Figure 12:
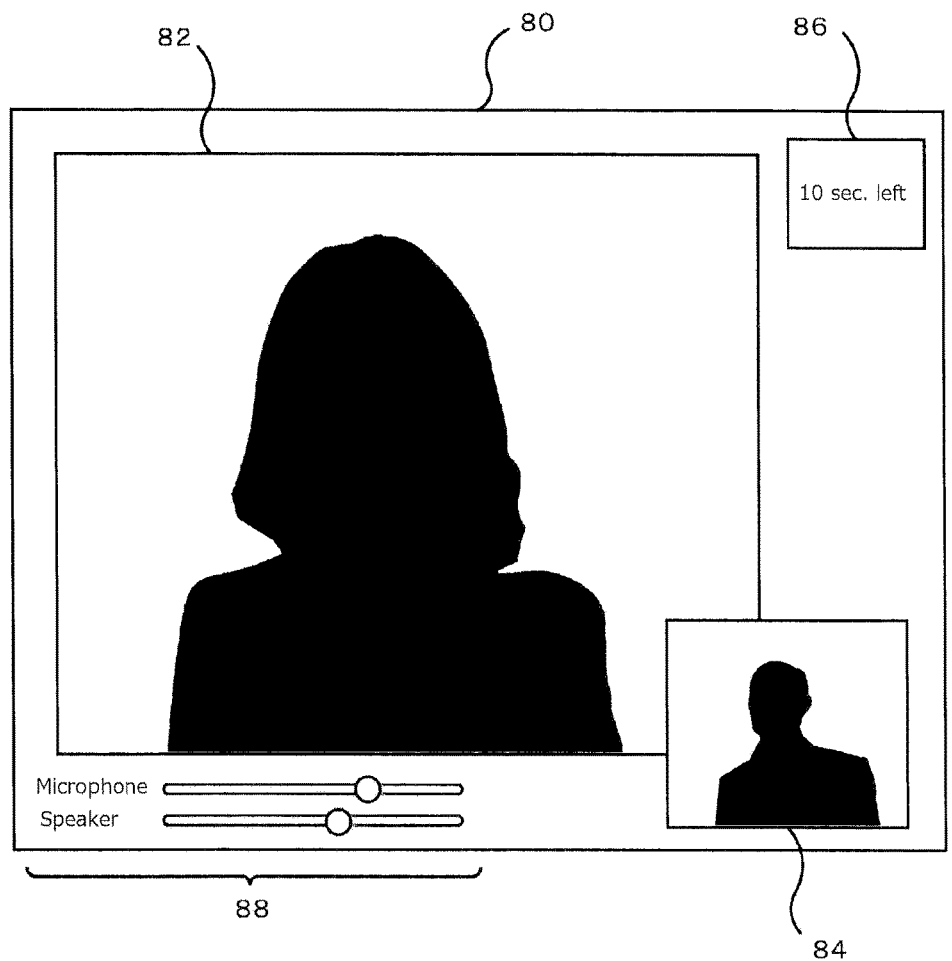
FIG. 12 is a diagram showing an example of performing screen 80 according to an embodiment.

The video chat may be performed by video chat communication between the terminal 30 of the performing user and the terminal 30 of the specific user. More specifically, in an embodiment, the server 10 may receive the video data inputted via cameras and microphones of the terminals 30 and send the video data received from each of the terminal 30 to the other. FIG. 12 shows an example of performing screen 80 during performance of the video chat. As shown, the performing screen 80 at this stage may include a partner video display area 82 for displaying the video image of the specific user, an own video display area 84 for displaying the performing user's own video image, an information area 86 for displaying various information, and an adjustment area 88 for the performing user to adjust the volume of the microphone and the speaker. The information area 86 may display information such as remaining time of the video chat. The user can enjoy video chat with the specific user via the performing screen 80.

In an embodiment, during the video chat between the performing user and the specific user, the video image displayed in the partner video display area 82 of the performing screen 80 may be displayed in the display object 102 in the virtual space 100 with the speech omitted (that is, the image inputted via the camera of the terminal 30 of the specific user is displayed). Accordingly, the users other than the performing user (the users standing by for the video chat and the users having finished the video chat) cannot listen to the voice of the specific user but can enjoy viewing the image.

Figure 13:
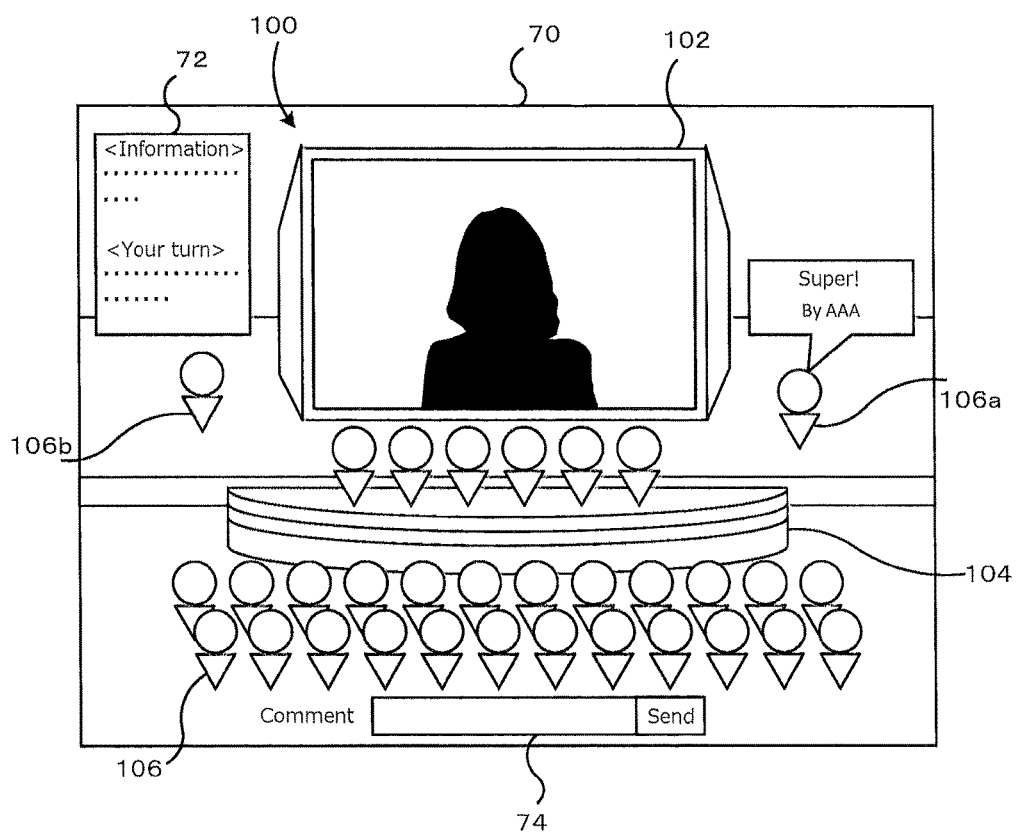
FIG. 13 is a diagram showing an example of standby screen 70 according to an embodiment.

Then, the video chat is terminated when the termination condition of the video chat (e.g., elapse of the duration assigned to the performing user, and/or elapse of a predetermined time) is satisfied (step S260, S270). The above cycle including specifying the performing user (step S220), sending the video image of the performing user to the terminal 30 of the administrator (step S230), and performing and terminating the video chat (step S240 to S270) may be repeated until the termination condition of the online event (e.g., the condition that all the users finish the video chat with the specific user) is satisfied (step S270). FIG. 13 shows an example of standby screen 70 displayed when the first user have finished the video chat with the specific user. As shown, in the virtual space 100, the avatar 106*a* of the user who has finished the video chat may be placed at the right end of the main stage 103 (on the right of the display object 102), and the avatar 106*b* of the user next to perform the video chat may be placed at the left end of the main stage 103 (on the left of the display object 102). Thus, as the plurality of users standing by for the video chat sequentially perform the video chat, the positions of the avatars 106 of the users in the virtual space 100 may be changed. As illustrated in FIG. 13, when a user having finished the video chat posts his or her reaction to the video chat via the comment posting area 74, the contents of the comment (e.g., "Super!" by AAA) may be displayed in a balloon from the avatar 106*a*. The other users can readily find and enjoy the comments by the user who has just finished the video chat.

The standby screen 70 in an embodiment may include an exit button not shown. When the user selects the exit button to leave the virtual space 100, the standby screen 70 may be closed. For example, the user having finished the video chat can stay in the virtual space 100, and enjoy viewing the video image of the specific user performing the video chat with another user and enjoy having text chat with other users. With a reservation for video chat with another specific user, the user having finished the video chat can enter (move to) the virtual space corresponding to the other specific user and stand by for the video chat with the other specific user. In this case, the user may be automatically moved into the virtual space corresponding to the other specific user (the virtual space 100 displayed in the standby screen 70 may be switched) at the timing a predetermined amount of time ahead of the time zone in which the reservation for video chat with the other specific user has been made.

In the embodiment, the order of the users to perform the video chat may be set in accordance with the order to enter the virtual space; however, this rule may be replaced with other rules to set the order. For example, the order may be set in accordance with the order of the users making a reservation for the video chat with the specific user.

In the embodiment, the performing user to perform the video chat with the specific user may be specified in accordance with the order having been set; however, this rule may be replaced with other rules to specify the performing user. For example, the performing user to perform the video chat may be specified based on the results of the game (including the scores) performed in the virtual space 100 or the virtual values (coins, items, etc.) used or consumed by the user in the virtual space 100. Further, the quality, duration (e.g., extended duration), and level (e.g., video chat with speech only (voice chat), video chat with speech and images, etc.) of the video chat to be performed may be determined based on the results of the game performed in the virtual space 100 or the virtual values used or consumed by the user in the virtual space 100.

In the embodiment, each numbered ticket may be associated with one specific user; additionally, each numbered ticket may also be associated with "a part" constituted by a plurality of time zones, such that the user can make a reservation for the video chat with the associated specific user in the time zones constituting the associated "part."

In the embodiment, when a plurality of specific users participate in an online event, a virtual space may be generated for each specific user; however, it may also be possible that, even when a plurality of specific users participate in an online event, one virtual space 100 is generated for each online event and the virtual space 100 includes a plurality of display objects corresponding to the plurality of specific users. In this case, the user can also enjoy viewing the images of the specific user with whom the user has not made a reservation for the video chat.

In the embodiments as described above, in response to a request from a user, the standby screen 70 including avatars 106 (user information) of a plurality of users standing by for the video chat with a specific user may be displayed on the terminal 30 of the user; one user may be specified from the plurality of users standing by in accordance with the order having been set (a predetermined rule); and the communication for video chat may be performed between the terminal 30 of the specified user and the terminal 30 of the specific user. Accordingly, the user may stand by for the video chat with the specific user while viewing the standby screen 70, and may enjoy the video chat with the specific user in accordance with the order having been set. That is, the embodiments of the present disclosure provide a setup that allows special communication between the user and the specific user.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A server for providing, to a user, a video chat with a specific user, comprising:
one or more computer processors, wherein the one or more computer processors execute readable instructions to perform:
causing, in response to a request from the user, a standby screen to be displayed on a terminal of the user, the standby screen being a screen for standing by for the video chat with the specific user and including user information of a plurality of users standing by for the video chat with the specific user; and
specifying, in accordance with a predetermined rule, one user from the plurality of users standing by, and causing communication for the video chat to be performed between a terminal of the specified user and a terminal of the one user from the plurality of users,
wherein causing the communication for the video chat to be performed includes causing the communication for the video chat to be performed within a video chat duration set based on a number of used items of reservation information necessary for a reservation for the video chat and specified by the user in making the reservation.

2. The server of claim 1, further comprising a storage configured to store at least participant information specifying a plurality of users capable of participating in the video chat with the specific user,
wherein causing the standby screen to be displayed includes causing the standby screen to be displayed on a terminal of a user specified as being capable of participating in the video chat with the specific user based on the participant information.

3. The server of claim 2, wherein the one or more computer processors further perform: causing, in response to a request from the user, a reservation screen for making a reservation for the video chat with the specific user to be displayed on the terminal of the user; and receiving the reservation made on the reservation screen by the user and updating the participant information such that the user is specified as being capable of participating in the video chat.

4. The server of claim 3, further comprising a storage configured to store, in association with the specific user, the reservation information necessary for making a reservation for the video chat with the specific user,
wherein the reservation screen is configured such that the user inputs the reservation information to make a reservation for the video chat with the specific user associated with the reservation information inputted by the user.

5. The server of claim 4, wherein the reservation screen is configured such that the user specifies a number of used items of the reservation information to make a reservation for the video chat with the specific user, and
updating the participant information includes setting a video chat duration based on the number of used items of the reservation information specified in the received reservation.

6. The server of claim 1, wherein the standby screen is configured such that text chat can be performed between the plurality of users standing by.

7. The server of claim 1, further comprising: a storage configured to store at least order information capable of specifying order of the plurality of users standing by for the video chat with the specific user to perform the video chat,
wherein the standby screen displays the user information corresponding to the plurality of users standing by based at least on the order information.

8. The server of claim 7, wherein the standby screen displays the user information corresponding to the plurality of users standing by at positions based at least on the order information.

9. The server of claim 1, wherein causing the communication for the video chat to be performed includes starting sending, to a certain terminal, video data of the specified user sent from the terminal of the specified user, and in response to an instruction from a user of the certain terminal, starting sending video data of the specific user sent from the terminal of the specific user to the terminal of the specified user.

10. The server of claim 1, wherein causing the communication for the video chat to be performed includes terminating the communication for the video chat and specifying another user in accordance with the predetermined rule when a predetermined amount of time elapsed after the specified user started the video chat with the specific user and/or when a current time reached a predetermined time.

11. A computer-readable storage medium storing instructions for providing, to a user, a video chat with a specific user, the instructions being configured to cause, upon execution via one or more computers, the one or more computers to perform:

causing, in response to a request from the user, a standby screen to be displayed on a terminal of the user, the standby screen being a screen for standing by for the video chat with the specific user and including user information of a plurality of users standing by for the video chat with the one user from the plurality of users, and specifying, in accordance with a predetermined rule, one user from the plurality of users standing by, and causing communication for the video chat to be performed between a terminal of the specified user and a terminal of the specific user, and wherein causing the communication for the video chat to be performed includes causing the communication for the video chat to be performed within a video chat duration set based on a number of used items of reservation information necessary for a reservation for the video chat and specified by the user in making the reservation.

12. A method using one or more computers for providing, to a user, a video chat with a specific user, the one or more computers comprising one or more processors configured to execute readable instructions to perform the method, comprising:

causing, in response to a request from the user, a standby screen to be displayed on a terminal of the user, the standby screen being a screen for standing by for the video chat with the specific user and including user information of a plurality of users standing by for the video chat with the specific user; and specifying, in accordance with a predetermined rule, one user from the plurality of users standing by, and causing communication for the video chat to be performed between a terminal of the one user from the plurality of users, wherein causing the communication for the video chat to be performed includes causing the communication for the video chat to be performed within a video chat duration set based on a number of used items of reservation information necessary for a reservation for the video chat and specified by the user in making the reservation.

* * * * *